(12) United States Patent
Park (10) Patent No.: US 12,520,750 B2
(45) Date of Patent: Jan. 13, 2026

(54) MID MOWER AUTO-CONNECTION DEVICE

(71) Applicant: Daedong Corporation, Daegu (KR)

(72) Inventor: Jin Mok Park, Gyeongsangnam-do (KR)

(73) Assignee: Daedong Corporation, Daegu (KR)

( * ) Notice: Subject to any disclaimer, the term of this patent is extended or adjusted under 35 U.S.C. 154(b) by 566 days.

(21) Appl. No.: 17/985,404

(22) Filed: Nov. 11, 2022

(65) Prior Publication Data

US 2023/0148032 A1   May 11, 2023

(30) Foreign Application Priority Data

Nov. 11, 2021   (KR) .......................... 10-2021-0154910

(51) Int. Cl.
*A01D 34/64*     (2006.01)
*A01D 67/00*     (2006.01)
*A01D 101/00*    (2006.01)

(52) U.S. Cl.
CPC ........... *A01D 34/64* (2013.01); *A01D 67/005* (2013.01); *A01D 2101/00* (2013.01)

(58) Field of Classification Search
CPC .............................. A01D 34/64; A01D 67/005
See application file for complete search history.

(56) References Cited

U.S. PATENT DOCUMENTS

| | | | | |
|---|---|---|---|---|
| 3,948,025 A * | 4/1976 | Erdman | ............... | A01B 51/026 172/776 |
| 5,816,035 A * | 10/1998 | Schick | ................... | A01D 34/74 56/15.8 |
| 5,927,055 A * | 7/1999 | Ferree | .................. | A01D 34/662 56/16.3 |
| 5,956,932 A * | 9/1999 | Schmidt | ................. | A01D 34/64 56/15.8 |
| 7,877,972 B2 * | 2/2011 | Fox | ........................ | A01D 34/64 56/15.6 |
| 9,622,406 B2 * | 4/2017 | Tada | ..................... | A01D 67/005 |
| 11,212,952 B2 * | 1/2022 | Martin | .................. | A01D 34/661 |
| 2008/0245044 A1 * | 10/2008 | Shick | ..................... | A01D 34/74 56/14.9 |

FOREIGN PATENT DOCUMENTS

KR    10-2019-0074333 A    6/2019

* cited by examiner

*Primary Examiner* — Claude J Brown
(74) *Attorney, Agent, or Firm* — LRK PATENT LAW FIRM (57) ABSTRACT

Disclosed is a mid mower device mounted between front and rear wheels of a working vehicle to perform grass mowing. The mid mower auto-connection device can reduce a mounting/removing time of the mid mower with respect to the working vehicle, and provide the user's convenience in response to mounting/removing of the mid mower. The device includes front fixation brackets fixed to a vehicle body frame of the working vehicle, a front shaft coupled to front links protruding toward a front space of the mid mower, rear fixation brackets fixed to rear portions of the mid mower, rotation links rotatably mounted to the vehicle body frame, a female connector shaft connected to a gear box of the mid mower via a universal joint, and a male connector shaft connected to a PTO shaft of the working vehicle via a universal joint, and including a male connector part.

7 Claims, 9 Drawing Sheets

MID MOWER AUTO-CONNECTION DEVICE

CROSS REFERENCE TO RELATED APPLICATION

The present application claims priority to Korean Patent Application No. 10-2021-0154910, filed Nov. 11, 2021, the entire content of which is incorporated herein for all purposes by this reference.

BACKGROUND OF THE INVENTION

1. Field of the Invention

The present disclosure relates to a mid mower device mounted to a portion between front wheels and rear wheels of a working vehicle to perform grass mowing. More particularly, the present disclosure relates to a mid mower auto-connection device capable of reducing a mounting/removing time of a mid mower with respect to a working vehicle, and of providing the user's convenience in response to mounting/removing of the mid mower.

2. Description of Related Art

In general, a mower is a device that can mow grass and the like to an appropriate length, and refers as a machine receiving power from an internal power source or an external power source and rotating a rotatable blade to perform grass mowing.

For example, in a mower that can mow grass by receiving power from a working vehicle (agricultural machine) such as a tractor, the mower is mounted to a front portion or a rear portion of the tractor or mounted to a portion between front wheels and rear wheels of the tractor and receives rotating power of a power take off (PTO) shaft of the tractor to operate a plurality of rotatable blades installed therein to efficiently mow grass. In addition, the mower has improved quality of the work thereof and is configured such that the cut grass is evenly distributed and discharged to the outside without being locally discharged, thereby preventing the growing grass from being crushed by the mowed grass and dying b.

As an example, Korean Patent Application Publication No. 2019-0074333 disclosed a mid mower device capable of mounting a mower to a portion between front wheels and rear wheels of a working vehicle and travelling the working vehicle and performing grass mowing through rotatable blades installed at the mower.

In the above-described document of Korean Patent Application Publication, a mower unit is mounted to a lower portion of a vehicle body between the front wheels and the rear wheels, an elevation and inclination cylinder is provided to adjust a degree of inclination of the mower unit, and a sensor part for confirming the terrain slope of a working location and a controller for controlling operation of the elevation and inclination cylinder in response to the terrain slope measured by the sensor part are provided. Accordingly, the inclination adjustment of the mower unit is possible in response to the terrain slope of the working location.

In the case of the mid mower mounted to the portion between the front wheels and the rear wheels of the working vehicle and performing grass mowing as described above, the mid mower is mounted to the working vehicle in a method in which the front wheels of the working vehicle moves over the mid mower placed on the ground and then the mid mower disposed between the front wheels and the rear wheels of the working vehicle is coupled to the working vehicle.

However, in the case of the conventional mid mower as described above, in order to connect the mid mower located between the front wheels and the rear wheels of the working vehicle to a lower portion of the working vehicle, a user needs to connect multiple connection links provided both of the mid mower and the working vehicle to each other, and to connect power transmission shafts provided in the mid mower and the working vehicle to each other. Therefore, a mounting time of the mid mower is excessive, and there is a need for the user to manually connect various connection links or power transmission shafts to each other, so that a lot of inconvenience is caused when the mid mower is installed at the working vehicle.

Documents of Related Art (Patent Document 1) Korean Patent Application Publication No. 2019-0074333 (Jun. 28, 2019)

SUMMARY OF THE INVENTION

Accordingly, the present disclosure has been made keeping in mind the above problems occurring in the related art, and the present invention is intended to propose a mid mower auto-connection device, which is configured to automatically perform mounting/removing of a mid mower in a process where a working vehicle moves forward/rearward over the mid mower, so that a mounting/removing time of the mid mower is significantly reduced and inconvenience caused by manual work in the mounting/removing of the mid mower is reduced, thereby increasing the use convenience.

In order to achieve the above object, according to one aspect of the present disclosure, there is provided a mid mower auto-connection device connecting a working vehicle to a mid mower, the mid mower auto-connection device including: front fixation brackets fixed to front portions of a vehicle body frame of the working vehicle; a front shaft coupled to ends of front links protruding toward a front space of the mid mower, and removably coupled to the front fixation brackets; rear fixation brackets fixed to rear portions of the mid mower; rotation links rotatably mounted to the vehicle body frame, and respectively including rear shafts removably coupled to the rear fixation brackets; a female connector shaft connected to a portion of a gear box of the mid mower via a universal joint, and including a female connector part at an end thereof; and a male connector shaft connected to a power take off (PTO) shaft of the working vehicle via a universal joint, and including a male connector part at an end thereof, the male connector part being removably coupled to the female connector part.

The female connector shaft may be formed longer than the male connector shaft.

The female connector part and the male connector part may have a spline coupling structure in which slip movement in a shaft direction may be possible but a rotating force in a circumferential direction may be transmitted.

The mid mower auto-connection device may include a support member rotatably mounted to the mid mower, and configured to support the female connector shaft from below.

The mid mower auto-connection device may include a rotatable shaft rotatably mounted to the mid mower with the support member being fixed to one portion thereof, and including a fixation rod part at another portion thereof, the fixation rod part being configured to move in conjunction with the support member.

The mid mower may include a rotation-preventing bracket engaged with the fixation rod part and configured to temporarily restrain rotational movement of the rotatable shaft.

When the mid mower moves upward, the support member may be separated from the female connector shaft by a downward pressure of the female connector shaft.

The mid mower auto-connection device may include: a support frame coupled to a portion of the gear box of the working vehicle, in which the PTO shaft is located; a rotatable bracket to which the male connector shaft is rotatably mounted, the rotatable bracket being coupled to one portion of the support frame to be vertically rotatable; and a spring configured to elastically connect the support frame to the rotatable bracket.

A bearing may be provided at the rotatable bracket to rotatably support the male connector shaft.

According to the configuration of the mid mower auto-connection device of the present disclosure configured as described above, in the process where the working vehicle moves forward or rearward over the mid mower, the mid mower can be automatically mounted to/removed from the lower portion of the working vehicle. Therefore, a time of mounting/removing of the mid mower can be significantly reduced, and in mounting/removing of the mid mower, there is no need for the user to conventionally perform a locking/releasing work of a connection link or a connection/removal work of a power transmission shaft in a manual manner before or after mounting of the mid mower, so that the use convenience can be improved. In addition, since the mechanical configuration for mounting/removing the mid mower with respect to the working vehicle is very simple, the manufacturing cost of the product can be significantly reduced.

DETAILED DESCRIPTION OF THE INVENTION

Hereinbelow, an exemplary embodiment of the present disclosure will be described in detail with reference to accompanying drawings such that the present disclosure can be easily embodied by one of ordinary skill in the art to which the present disclosure belongs.

However, the present disclosure may be embodied in many different forms and is not limited to the embodiment described hereinbelow. Furthermore, the same reference numerals marked throughout the detailed description refer to the same or similar elements throughout.

Hereinbelow, a mid mower auto-connection device according to an exemplary embodiment of the present disclosure will be described in detail with reference to accompanying drawings. Here, a direction of forward moving of a working vehicle is defined as a forward direction, and a direction of rearward moving of the working vehicle is defined as a rearward direction.

Referring to FIGS. 1 to 5, the mid mower auto-connection device according to the present disclosure includes front fixation brackets 220 fixed to front portion of a vehicle body frame 210 of a working vehicle, a front shaft 112 disposed at a front side of a mid mower 100 and removably coupled to the front fixation brackets 220, rear fixation brackets 120 fixed to rear portions of the mid mower 100, rear shafts 232 respectively coupled to ends of rotation links 230 mounted to the vehicle body frame 210 and removably coupled to the rear fixation brackets 120, a female connector shaft 140 connected to a portion of a gear box 102 of the mid mower 100 via a universal joint 130, and a male connector shaft 260 connected to a power take off (PTO) shaft (not shown) of the working vehicle via a universal joint 250 and removably coupled to the female connector shaft 140.

Figure 2:
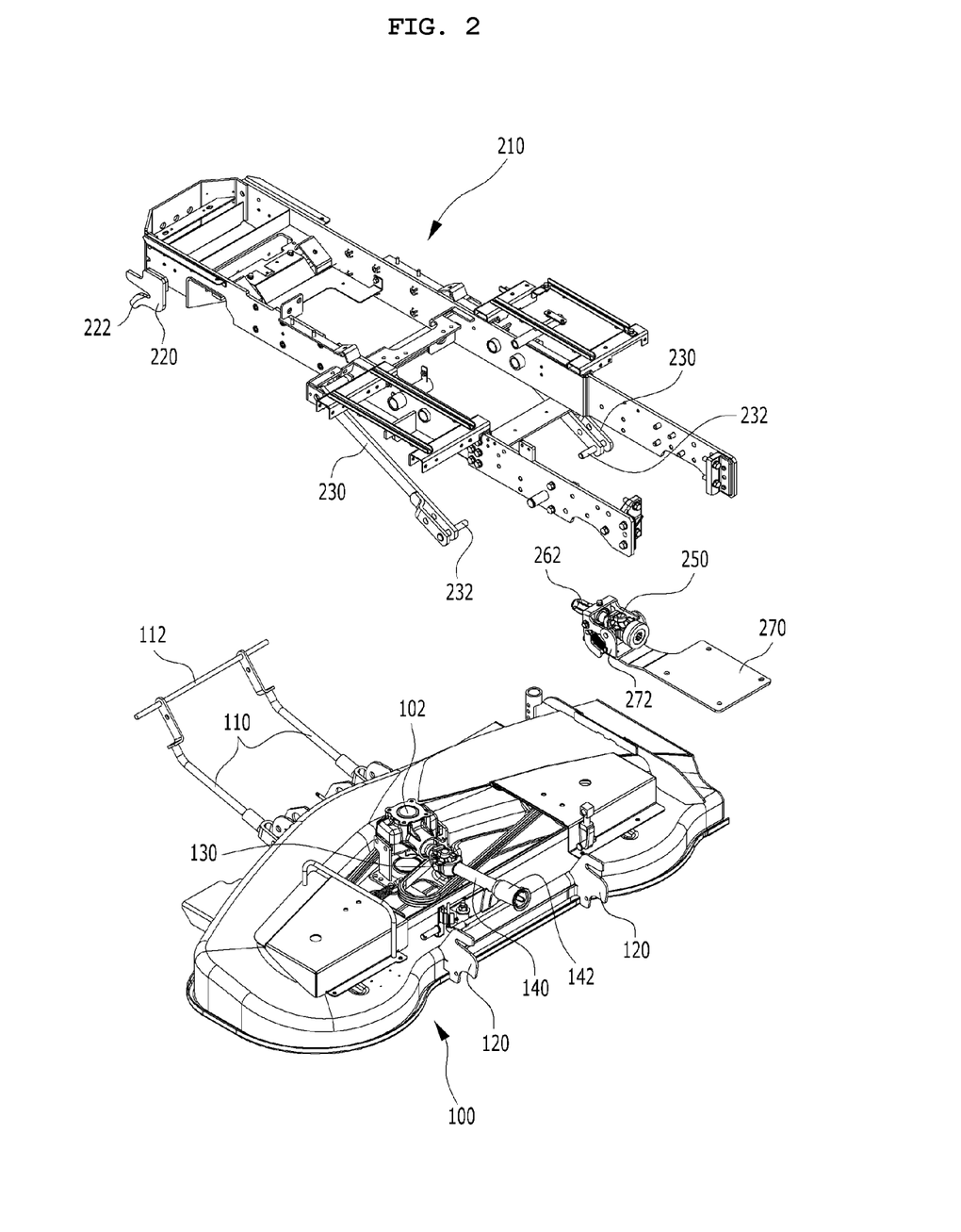
FIG. 2 is an exploded-perspective view showing a main part structure of the mid mower auto-connection device according to the present disclosure.
Figure 3:
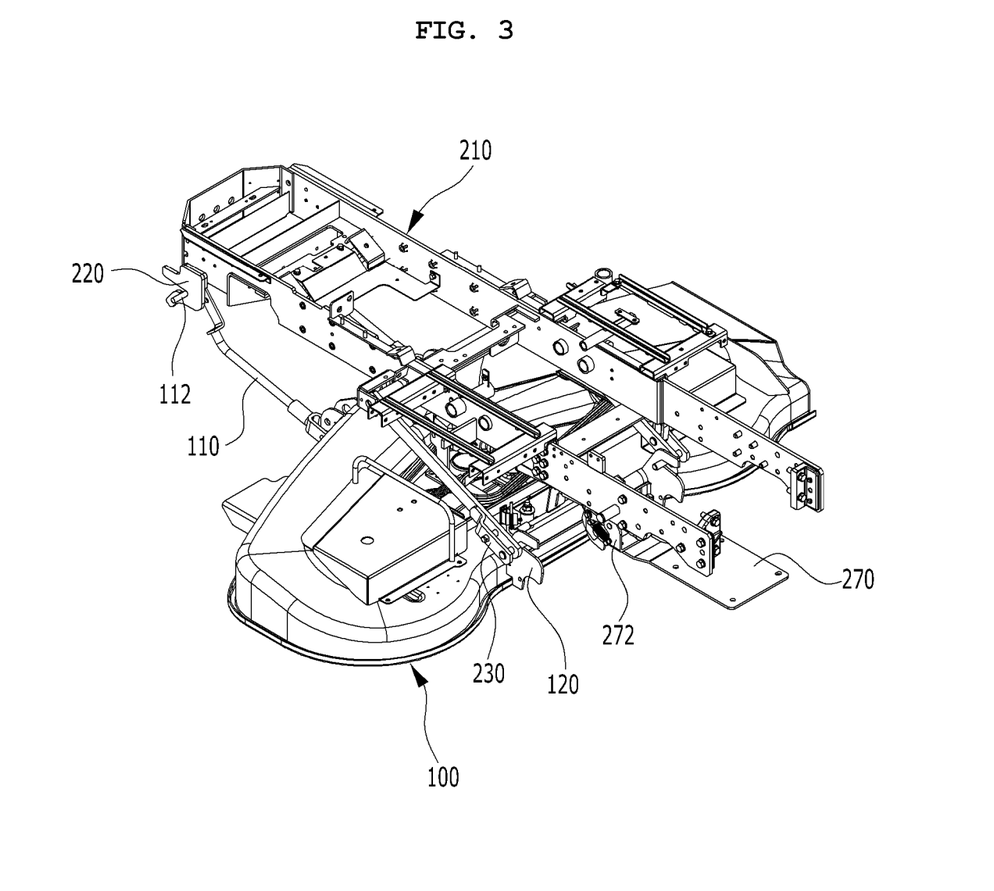
FIG. 3 is an assembly view of FIG. 2.
Figure 4:
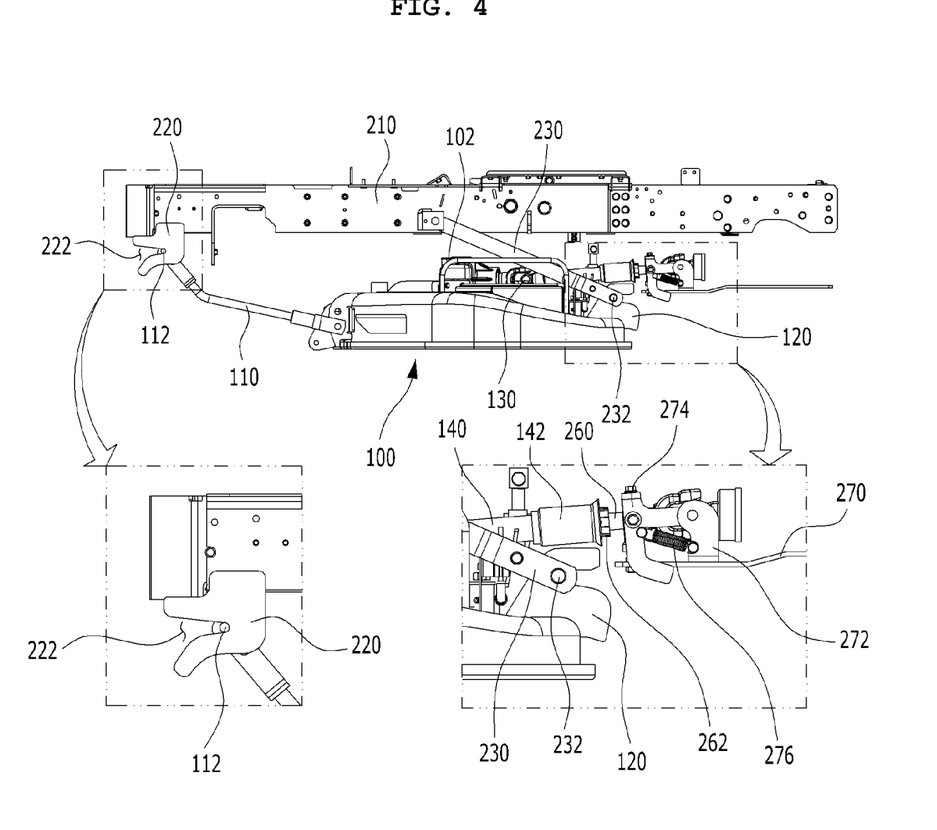
FIG. 4 is a side view of FIG. 3.

The pair of front fixation brackets 220 is mounted to the opposite front lateral surfaces of the vehicle body frame 210 and the front fixation brackets 220 are fastened to the front shaft 112 of front links 110 disposed at the front side of the mid mower 100.

Openings 222 are respectively formed in front portions of the front fixation brackets 220 and have forward opening shapes so that the front shaft 112 fixed to ends of the front links 110 is inserted thereinto. Here, in order to easily insert the front shaft 112 into the openings, entrance portions of the openings 222 may be formed to have widths vertically inclined and extending.

In addition, the front links 110 with the front shaft 112, the front shaft 112 being fastened to the front fixation brackets 220 of the vehicle body frame 210, are coupled to front portions of the mid mower 100. In this case, the front links 110 are projected toward the front side of the mid mower 100 by a predetermined length and the ends thereof are bent to be inclined upward. In addition, the ends of the front links 110 are coupled to the front shaft 112 engaged with the front fixation brackets 220.

Figure 1:
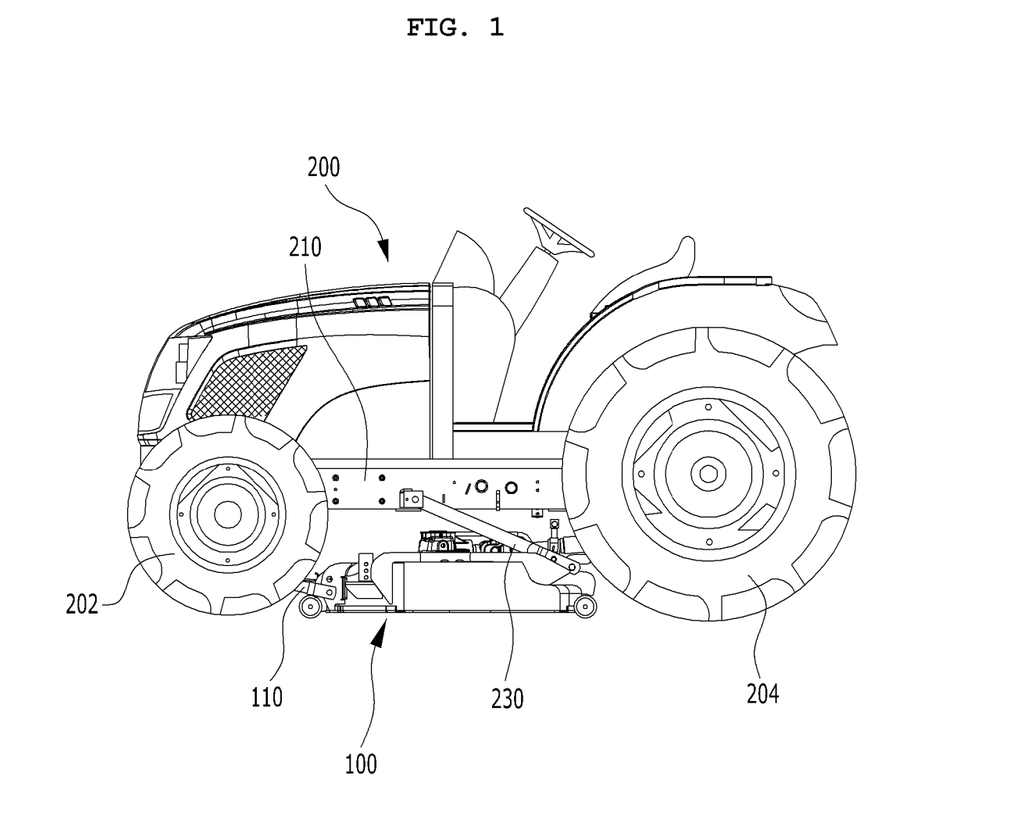
FIG. 1 is a side view showing a mounting state of a mid mower to a working vehicle via a mid mower auto-connection device according to the present disclosure.

With the above-described structure, when the mid mower 100 is mounted to the working vehicle 200, front wheels 202 of the working vehicle 200 move forward over the mid mower 100, the front shaft 112 of the mid mower 100 is inserted into and engaged with the openings 222 of the front fixation brackets 220 of the vehicle body frame 210 so that coupling between the front shaft 112 and the front fixation brackets 220 can be achieved.

Meanwhile, the rear fixation brackets 120 are fixed to the rear portions of the mid mower 100 and the rear fixation brackets 120 are engaged with and coupled to the rear shafts 232 fixed to the ends of the rotation links 230 of the vehicle body frame 210.

Here, first ends of the rotation links 230 are rotatably coupled to lateral surfaces of the vehicle body frame 210 at a predetermined gap rearward from the front fixation brackets 220, and second ends thereof are coupled to the rear shafts 232 engaged with the rear fixation brackets 120 fixed to the mid mower 100.

Openings 122 are formed in rear portions of the rear fixation brackets 120 and have rearward opening shapes so that the rear shafts 232 coupled to the ends of the rotation links 230 are inserted thereinto.

In this case, the openings 122 of the rear fixation brackets 120 are formed to have the opening direction opposite to the opening direction of the openings 222 of the front fixation brackets 220, and the entrance portions of the openings 122 of the rear fixation brackets 120 are also formed to have constant vertically inclined and extending widths as in the openings 222 of the front fixation brackets 220.

Here, the rear shafts 232 are respectively coupled to the ends of the two rotation links 230 coupled to the opposite lateral surfaces of the vehicle body frame 210, but the above-described front shaft 112 has a structure in which one front shaft is provided and coupled to the ends of the front links 110.

Therefore, a coupling structure is provided such that the one front shaft 112 is engaged with the pair of front fixation brackets 220 at the front side of the mid mower 100 and the pair of rear shafts 232 fixed to the ends of the rotation links 230 is engaged with the pair of rear fixation brackets 120 fixed to the mid mower 100 at the rear side of the mid mower 100.

With the above-described structure, when the front wheels 202 of the working vehicle 200 move forward over the mid mower 100, the one front shaft 112 located at the front side of the mid mower 100 is coupled to the pair of front fixation brackets 220 of the vehicle body frame 210, and simultaneously, the pair of rear shafts 232 coupled to the ends of the rotation links 230 of the vehicle body frame 210 is respectively coupled to the pair of rear fixation brackets 120 located at the rear side of the mid mower 100. Accordingly, the mid mower 100 is disposed between the front wheels 202 and rear wheels 204 of the working vehicle 200 and simultaneous fastening between the mid mower and the vehicle body frame 210 is achieved at four different positions of the vehicle body frame 210, so that a stable fixed state is maintained below the vehicle body frame 210 without movement.

Figure 5:
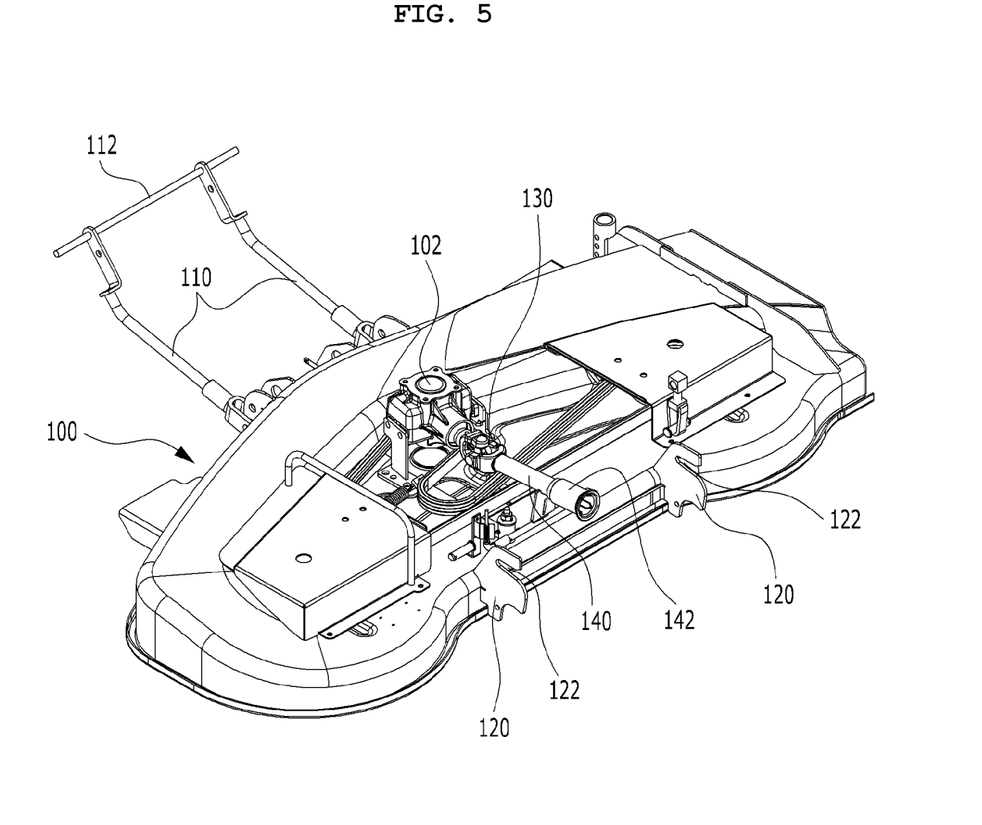
FIG. 5 is a detail view showing a structure of the mid mower according to the present disclosure.

Meanwhile, the mid mower 100 includes the gear box 102 mounted thereto and capable of receiving power from the PTO shaft (not shown) mounted to the working vehicle 200 and driving a plurality of rotation blades (not shown) provided therein, and includes the female connector shaft 140 connected to an input shaft of the gear box 102 via the universal joint 130. In addition, an end of the female connector shaft 140 has a female connector part 142 that may be engaged with and coupled to a male connector part 262 to be described below.

Furthermore, the working vehicle 200 includes the male connector shaft 260 connected to the PTO shaft (not shown) protruding from a gear box 240 therein via the universal joint 250, and an end of the male connector shaft 260 has the male connector part 262 inserted into the female connector part 142 and removably coupled to the female connector part 142.

When the working vehicle 200 moves forward, the female connector shaft 140 and the male connector shaft 260 are fastened to each other by a docking operation between the female connector part 142 and the male connector part 262 and thus power transmission is achieved. When the working vehicle 200 moves rearward, the female connector part 142 and the male connector part 262 are separated from each other and thus power transmission is cut off.

In this case, the female connector part 142 and the male connector part 262 may be coupled to each other in a spline coupling structure in which slip movement in a shaft direction is possible but a rotating force in a circumferential direction is transmitted. Then, according to forward and rearward movements of the working vehicle 200, the female connector part 142 and the male connector part 262 are easily coupled to or separated from each other, and with the female connector part 142 and the male connector part 262 being engaged and coupled to each other, relative movement in the circumferential direction is impossible. Therefore, power of the PTO shaft can be transmitted whole toward the mid mower 100 via the male connector shaft 260 and the female connector shaft 140 engaged with each other.

Here, the female connector shaft 140 has a structure extending long rearward from the gear box 102 located at the center portion of the mid mower 100. In other words, the female connector shaft 140 may be formed to have a sufficiently long length so that the female connector part 142 is located to an outer portion of a rear end of the mid mower 100. On the other hand, the male connector shaft 260 connected to the PTO shaft via the universal joint 250 is formed to have a length relatively shorter than the female connector shaft 140.

Because, in the case in which the length of the male connector shaft 260 mounted to the working vehicle 200 is formed longer than the length of the female connector shaft 140, when the working vehicle 200 moves forward to connect the male connector shaft 260 to the female connector shaft 140 of the mid mower 100, docking of a long male connector shaft 260 to a short female connector shaft 140 is relatively not easy due to movement, etc. of the working vehicle 200. In addition, even when the working vehicle 200 is independently operated without the mid mower 100, operation of the working vehicle is inefficient with the long male connector part 262.

Figure 6:
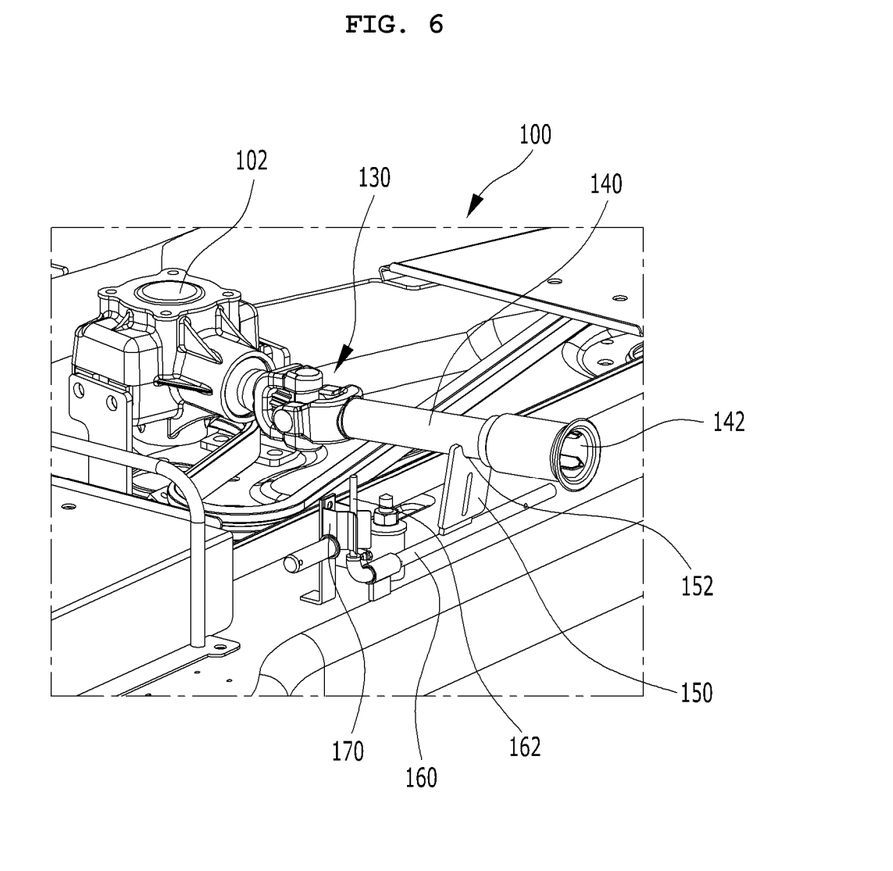
FIG. 6 is a perspective view showing the mid mower, wherein a female connector shaft is supported by a support member.

Meanwhile, FIG. 6 is a detail view showing a structure in which the female connector shaft of the mid mower is supported by a support member.

As shown in FIG. 6, the support member 150 is rotatably installed to the mid mower 100 to support the female connector shaft 140 from below.

The support member 150 has a plate shape, and an arc-shaped support groove 152 is formed on an upper portion thereof in contact with the female connector shaft 140, and the arc shape of the support groove 152 corresponds to an outer circumferential surface shape of the female connector shaft 140.

In addition, a lower end of the support member 150 is fixed to a portion of a rotatable shaft 160 rotatably mounted to the mid mower 100, so that when the rotatable shaft 160 rotates, the support member 150 may rotate in conjunction with the rotation of the rotatable shaft 160.

Furthermore, the rotatable shaft 160 includes a fixation rod part 162 of which one end is perpendicularly bent upward. Corresponding thereto, the mid mower 100 includes a rotation-preventing bracket 170, and the rotation-preventing bracket 170 temporarily restrains the fixation rod part 162 to prevent the support member 150 supporting the female connector shaft 140 from below from spontaneously rotating.

In this case, the rotation-preventing bracket 170 may have a clip shape of which portions coupled to the fixation rod part 162 are elastically opened from each other or closed to each other.

Accordingly, when the fixation rod part 162 is engaged with the rotation-preventing bracket 170, since the rotation of the rotatable shaft 160 is not performed, the support member 150 may stably support the female connector shaft 140 while being in a standing state.

In this case, when the fixation rod part 162 is engaged with the rotation-preventing bracket 170, the upper portion of the support member 150 supporting the female connector shaft 140 is not perpendicular to the ground and has a shape inclined toward the rear side of the mid mower 100 at a predetermined angle. The female connector shaft 140 may also maintain a fixed state with a shape that is not in parallel to the ground and is inclined upward toward the rear side of the mid mower 100 at a predetermined angle.

Here, since an angle between the female connector shaft 140 and the ground varies in response to standing angles of the support member 150, an inclination angle of the female connector shaft 140 can be properly adjusted via the support member 150 so as to achieve the optimum angle at which docking between the female connector shaft 140 and the male connector shaft 260 is easily performed.

In addition, when the mid mower 100 moves upward, slip between the female connector shaft 140 and the support member 150 occurs due to the ascending force, and a rotating force in a downward direction is generated to the support member 150. Accordingly, as the restraining force between the rotation-preventing bracket 170 and the fixation rod part 162 is forcibly released, the support member 150 may be separated from the female connector shaft 140. In this case, the female connector shaft 140 loses the support force applied by the support member 150 and may rotate downward by its weight.

Figure 7:
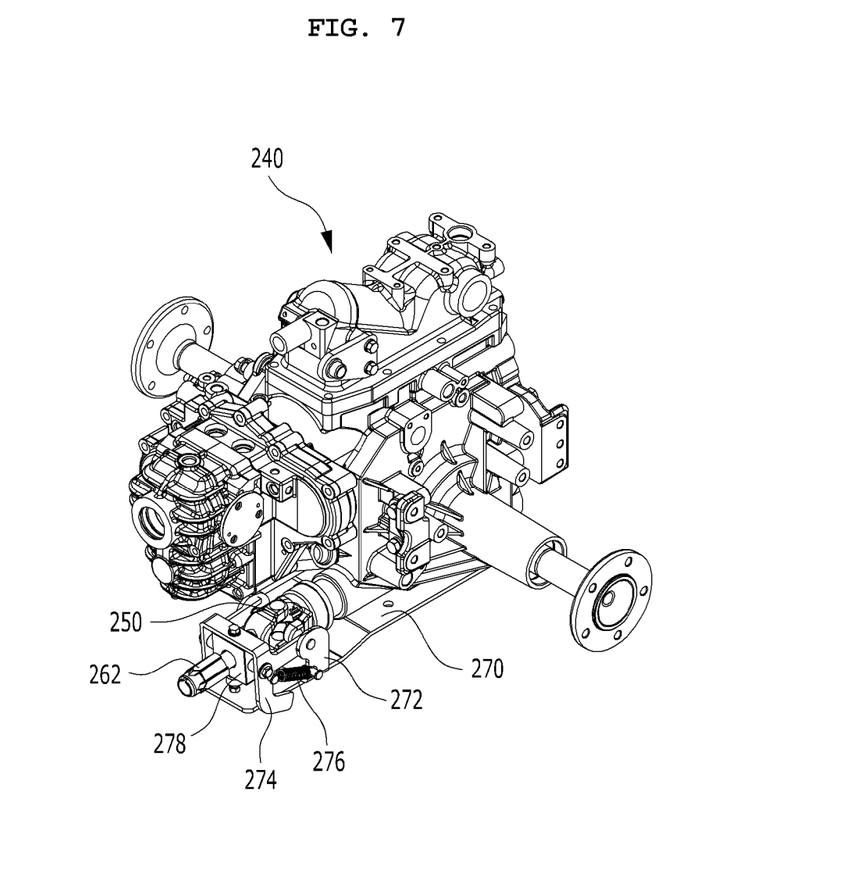
FIG. 7 is a perspective view showing a state in which a male connector shaft is mounted to a support frame coupled to a portion of a gear box of the working vehicle.
Figure 8:
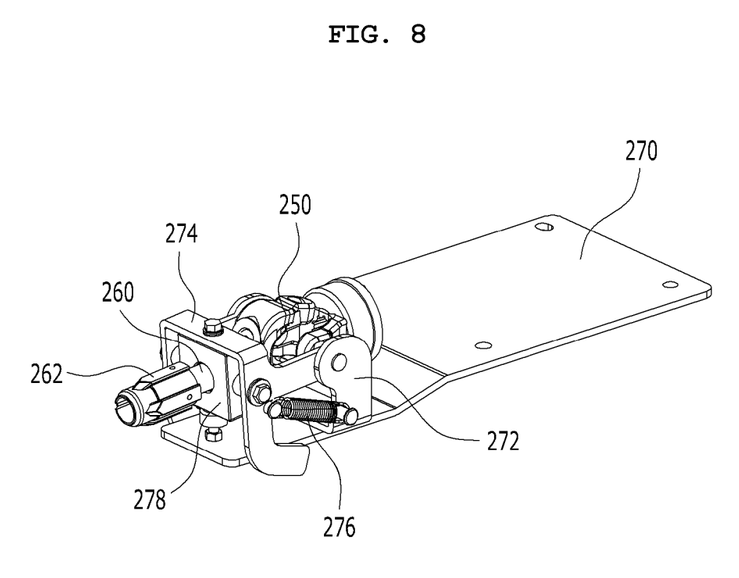
FIG. 8 is a detail view showing a structure in which a rotatable bracket, to which the male connector shaft is mounted, is rotatably installed at a support bracket.

Meanwhile, FIG. 7 is a perspective view showing a state in which the rotatable bracket with the male connector shaft is mounted to the support frame fixed to a portion of the gear box of the working vehicle, at which the PTO shaft is located. FIG. 8 is a detail view showing a state in which the female connector shaft is rotatably installed at a portion of the support frame via the rotatable bracket.

As shown in FIGS. 7 and 8, a support frame 270 is coupled to the portion of the gear box 240 of the working vehicle 200 with the PTO shaft being located at the portion, thereby rotatably supporting the male connector shaft 260.

A portion of the support frame 270 coupled to the portion of the gear box 240 is shaped into a plate, and a support bracket 272 is coupled to one portion of the plate-shaped support frame 270, and the support bracket 272 is formed to be perpendicular to the support frame 270 and bent upward.

In addition, a rotatable bracket 274 coupled to the male connector shaft 260 is rotatably mounted to a portion of the support bracket 272, and the rotatable bracket 274 may rotate upward and downward around the portion coupled to the support bracket 272.

Furthermore, a spring 276 is mounted between the support bracket 272 and the rotatable bracket 274. The spring 276 elastically connects the support bracket 272 to the rotatable bracket 274, and prevents the rotatable bracket 274 from spontaneously rotating upward.

In other words, the spring 276 serves to prevent the male connector shaft 260 coupled to the rotatable bracket 274 from tipping upward at a predetermined angle or more and to maintain an aligned state such that the male connector shaft 260 is maintained at an angle capable of easily fastening the male connector shaft 260 to the female connector shaft 140. In addition, a bearing 278 is mounted to an inner portion of the rotatable bracket 274 to rotatably support the male connector shaft 260.

Hereinbelow, a process in which the mid mower 100 is mounted to the working vehicle 200 via the mid mower auto-connection device of the present disclosure having the above-described structure will be described.

Figure 9:
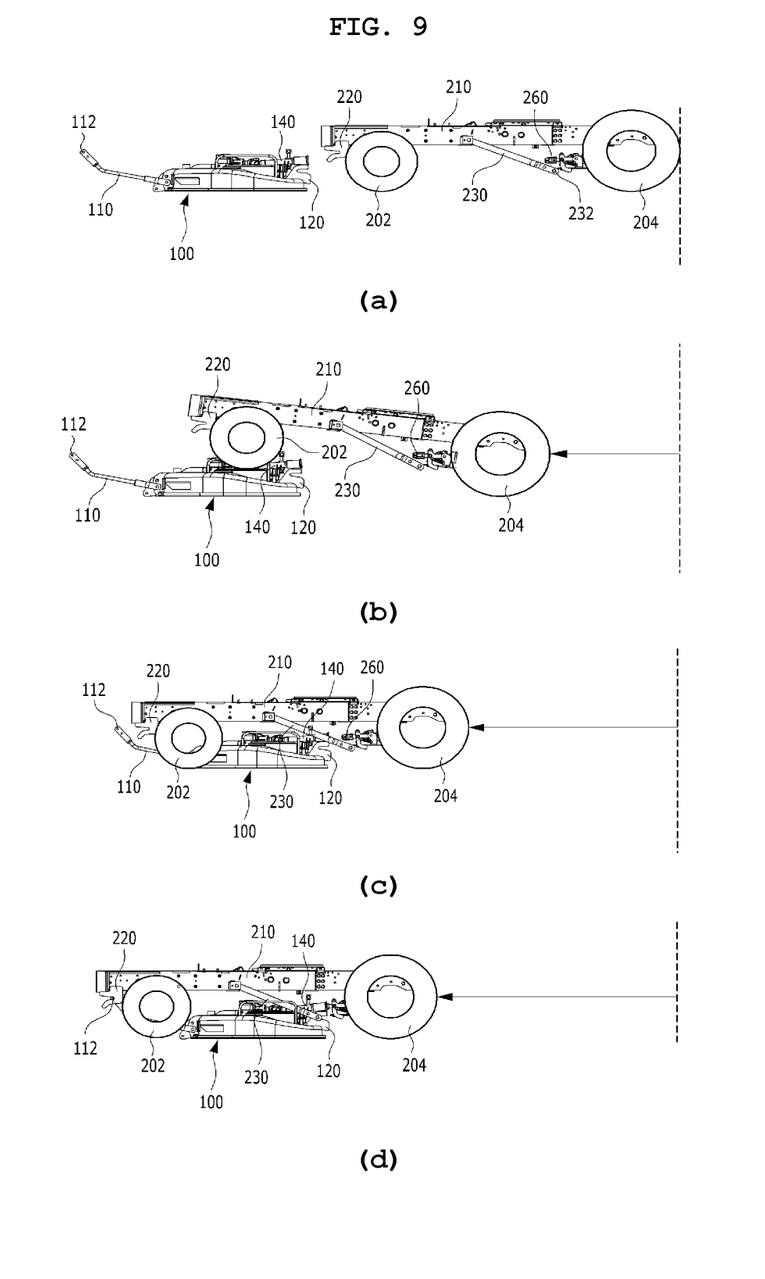
FIG. 9 is an example view successively showing a mounting process in which the mid mower is mounted to the working vehicle via the mid mower auto-connection device of the present disclosure.

FIG. 9 is an example view successively showing a mounting process in which the mid mower is mounted to the working vehicle via the mid mower auto-connection device of the present disclosure.

First, FIG. 9(a) is a view showing a state before the mid mower 100 is mounted to the vehicle body frame 210 of the working vehicle, and in mounting of the mid mower 100, the working vehicle 200 is located at the rear space of the mid mower 100.

In the state of FIG. 9(a), when the working vehicle 200 moves forward by a user (driver) for mounting of the mid mower 100, as shown in FIG. 9(b), the front wheels 202 of the working vehicle 200 stride over the mid mower 100.

As described above, as shown in FIG. 9(c), when the front wheels 202 of the working vehicle 200 are in contact with the ground by completely striding over the mid mower 100 and the working vehicle moves further forward, as shown in FIG. 9(d), portions of the front fixation brackets 220 fixed to the front portions of the vehicle body frame 210 are fastened to portions of the front shaft 112 of the front links 110 protruding forward of the mid mower 100. Meanwhile, at the rear space of the mid mower 100, the rear shafts 232 fixed to the ends of the rotation links 230 are fastened to the rear fixation brackets 120 fixed to the rear portions of the mid mower 100. Accordingly, as the mid mower 100 is fastened to the working vehicle 200 between the front wheels 202 and the rear wheels 204 of the working vehicle 200 at the two front points and the two rear points of the vehicle body frame 210 at the same time, the solid fastening state of the mid mower 100 without movements in all directions may be maintained below the vehicle body frame 210.

At the same time, as the male connector part 262 formed at the end of the male connector shaft 260 of the vehicle body frame 210 is inserted into the female connector part 142 formed at the end of the female connector shaft 140 of the mid mower 100 and docking between the male connector part 262 and the female connector part 142 is achieved, mounting of the mid mower 100 is completed, and the male connector shaft 260 and the female connector shaft 140 can maintain the connected state in which power transmission is possible from the PTO shaft toward the mid mower 100.

As described above, in mounting of the mid mower 100, in the process in which the working vehicle 200 moves forward over the mid mower 100 placed on the ground, after the front fixation brackets 220 of the vehicle body frame 210 are fastened to the front shaft 112 of the mid mower 100, and simultaneously, the rear shafts 232 of the vehicle body frame 210 are fastened to the rear fixation brackets 120 of the mid mower 100, the male connector part 262 and the female connector part 142 dock on each other, and thus the mounting of the mid mower 100 can be completed by the simple process of fastening between the male connector shaft 260 and the female connector shaft 140.

On the contrary to this, in releasing connection of the mid mower 100 from the working vehicle 200, when the working vehicle 200 moves rearward on the contrary to the mounting of the mid mower, in a process in which the front wheels 202 move rearward over the mid mower 100, coupling between the front fixation brackets 220 of the vehicle body frame 210 and the front shaft 112 of the mid mower 100 is released, and simultaneously, coupling between the rear shafts 232 of the rotation links 230 and the rear fixation brackets 120 of the mid mower 100 is released. Continuously, after a process of releasing coupling between the male connector shaft 260 and the female connector shaft 140, a separation work of the mid mower 100 from the working vehicle 200 can be completed.

As described above, in the process in which the working vehicle 200 moves forward or rearward over the mid mower 100 placed on the ground, since mounting/removing work of the mid mower 100 is simply performed in a short time via the mid mower auto-connection device of the present disclosure, there is no need for the user to perform a locking work with respect to each connection part or an additional manual work of fastening the female connector shaft to the male connector shaft before and after the stage of mounting of the mid mower, as in the conventional device, so that there is an effect that user convenience can be significantly improved.

Although the preferred embodiment of the present disclosure has been disclosed in detail only with respect to the above specific embodiments, those skilled in the art will appreciate that various modifications, additions, and substitutions are possible, without departing from the spirit and scope of the present disclosure, and it is understood that the various modifications, additions, and substitutions belong to the accompanying claims.

What is claimed is:

1. A mid mower auto-connection device connecting a working vehicle to a mid mower, the mid mower auto-connection device comprising:
    front fixation brackets fixed to front portions of a vehicle body frame of the working vehicle;
    a front shaft coupled to ends of front links protruding toward a front space of the mid mower, and removably coupled to the front fixation brackets;
    rear fixation brackets fixed to rear portions of the mid mower;
    rotation links rotatably mounted to the vehicle body frame, and respectively comprising rear shafts removably coupled to the rear fixation brackets;
    a female connector shaft connected to a portion of a gear box of the mid mower via a universal joint, and comprising a female connector part at an end thereof;
    a male connector shaft connected to a power take off (PTO) shaft of the working vehicle via a universal joint, and comprising a male connector part at an end thereof, the male connector part being removably coupled to the female connector part;
    a support member rotatably mounted to the mid mower, and configured to support the female connector shaft from below; and
    a rotatable shaft rotatably mounted to the mid mower with the support member being fixed to one portion thereof, and comprising a fixation rod part at another portion thereof, the fixation rod part being configured to move in conjunction with the support member.

2. The mid mower auto-connection device of claim 1, wherein the female connector shaft is formed longer than the male connector shaft.

3. The mid mower auto-connection device of claim 1, wherein the female connector part and the male connector part have a spline coupling structure in which slip movement in a shaft direction is possible but a rotating force in a circumferential direction is transmitted.

4. The mid mower auto-connection device of claim 1, wherein the mid mower comprises a rotation-preventing bracket engaged with the fixation rod part and configured to temporarily restrain rotational movement of the rotatable shaft.

5. The mid mower auto-connection device of claim 4, wherein when the mid mower moves upward, the support member is separated from the female connector shaft by a downward pressure of the female connector shaft.

6. The mid mower auto-connection device of claim 1, further comprising:
    a support frame coupled to a portion of the gear box of the working vehicle, in which the PTO shaft is located;
    a rotatable bracket to which the male connector shaft is rotatably mounted, the rotatable bracket being coupled to one portion of the support frame to be vertically rotatable; and
    a spring configured to elastically connect the support frame to the rotatable bracket.

7. The mid mower auto-connection device of claim 6, wherein a bearing is provided at the rotatable bracket to rotatably support the male connector shaft.

* * * * *